Patented Apr. 22, 1930

1,755,399

UNITED STATES PATENT OFFICE

JOHANN KNEIFL, OF MAHR. SCHONBERG, CZECHOSLOVAKIA

METHOD OF PRODUCING ARTIFICIAL MARBLE

No Drawing. Application filed September 25, 1928, Serial No. 308,339, and in Czechoslovakia May 21, 1928.

The invention relates to a method of producing artificial marble, in which in most cases slabs of material which can be ground, for instance asbestos cement, are provided with a glazing and consists essentially in this that this glazing is composed of substances allowing a treatment in baths, in order to obtain the finished product with a considerably higher degree of hardness as compared with marble substitutes hitherto known, the product being water and acid proof, as well as resistant to changes in temperature.

According to the invention the glazing consists of a mass which can be applied to the slab which has previously been ground clean, this mass being composed of the following materials: 25 parts by weight (Gwt.) water, 25 Gwt. soda water glass 40° Bé., 8 Gwt. potassium carbonate, 5 Gwt. potassium sulphate, 2 Gwt. calcium phosphate and 35 Gwt. of a suitable coloring matter.

This glazing material is applied with a brush or by the known spraying process, for instance to the slate slab of asbestos cement which has previously been ground clean. According to the desired color of the marbling, a homogeneously colored layer is applied or a glazing material of different color is inserted in this basic layer, so that the most varied designs of marble can be obtained as desired.

This glazing is allowed to dry on the slab. In order to impart a high degree of hardness to this glazing, and make it water and acid-proof, the slabs provided with the glazing are subjected to a boiling process in a bath at 100–110° C. for about 3 hours.

The bath is composed of: 200 parts by weight (Gwt.) water, 8 Gwt. calcium carbonate, 2 Gwt. potassium chloride, 5 Gwt. magnesium chloride, 30 Gwt. calcium chloride, 8 Gwt. nitric acid 40° Bé., 6 Gwt. acetic acid 80° Bé., 6 Gwt. sulphuric acid 66° Bé., 20 Gwt. sodium chloride, 8 Gwt. magnesium sulphate, 6 Gwt. citric acid.

This bath, which may also consist of other substances having a similar action, effects a petrifaction of the glazing to a degree of hardness of 6–8 and enables the production of slabs of about 5 m. length and 2 m. width, an advantage which could not be obtained with the baking processes hitherto employed.

After the boiling the slab is removed from the bath and lowered directly into a cold bath, in which it remains for about 3 hours and which is composed of 200 parts by weight (Gwt.) water, 40 Gwt. caustic potash, 32 Gwt. soda lye and 28 Gwt. alum. This bath makes the slab resistant to the influence of temperature. After this bath the slab when removed, is rinsed with water, dried, ground and polished to a high lustre.

What I claim is:—

A method of producing artificial marble, consisting in applying a glazing mass consisting of water, potassium carbonate, soda water glass, potassium sulphate, calcium phosphate and a suitable coloring matter to the surface of a slab of material which can be ground, boiling the said slab with the glazing mass in a bath composed of water, calcium carbonate, potassium chloride, magnesium chloride, calcium chloride, nitric acid, acetic acid, sulphuric acid, sodium chloride, magnesium sulphate and citric acid, at a temperature of 100°–110° C. for about three hours, thereupon placing the said slab in a cold bath consisting of water, caustic potash, soda lye and alum for about three hours, then rinsing with water, drying, grinding and polishing, as and for the purpose set forth.

In testimony whereof I have signed my name to this specification.

JOHANN KNEIFL.